United States Patent [19]

McNall

[11] 4,406,642
[45] Sep. 27, 1983

[54] SHAFT DAMPENING APPARATUS
[75] Inventor: Fredlee M. McNall, Allegany, N.Y.
[73] Assignee: Dresser Industries, Inc., Dallas, Tex.
[21] Appl. No.: 253,430
[22] Filed: Apr. 13, 1981
[51] Int. Cl.[3] .............................................. F16F 15/10
[52] U.S. Cl. ....................................... 464/180; 74/574
[58] Field of Search ..................... 464/29, 180; 74/573,
74/574; 310/51; 308/10

[56] References Cited
U.S. PATENT DOCUMENTS

| 2,320,721 | 6/1943 | Ericson | 74/574 |
| 2,520,582 | 8/1950 | Tustin | 74/574 |
| 2,951,955 | 9/1960 | Crowder . | |
| 3,336,818 | 8/1967 | Allen | 74/573 |
| 3,786,694 | 1/1974 | Willeitner | 74/573 |
| 4,072,370 | 2/1978 | Waason | 308/10 |
| 4,079,274 | 3/1978 | Richmond | 310/51 |
| 4,200,003 | 4/1980 | Miller | 74/574 |

FOREIGN PATENT DOCUMENTS

| 2360412 | 6/1975 | Fed. Rep. of Germany | 308/10 |
| 2451972 | 5/1976 | Fed. Rep. of Germany | 308/10 |
| 708059 | 4/1954 | United Kingdom | 74/574 |

Primary Examiner—Stanley N. Gilreath
Assistant Examiner—Daniel P. Stodola
Attorney, Agent, or Firm—Daniel Rubin

[57] ABSTRACT

An electrically conductive ring is secured to a rotating shaft electrically insulated therefrom at or near the shaft location at which the maximum amplitude of lateral vibration is anticipated. Providing a transverse magnetic field contiguous to the ring periphery is at least one pair of spaced magnets. The magnetic field imposed by the magnets is effective when vibrationally penetrated by the ring to induce an electrical current in the ring causing energy dissipation that repels the amplitude of the shaft.

7 Claims, 4 Drawing Figures

SHAFT DAMPENING APPARATUS

TECHNICAL FIELD

The field of art to which the invention pertains comprises the art of machine elements and mechanisms including vibration dampening means for rotating shafts.

BACKGROUND OF THE INVENTION

Most machinery shafts subject to rotation are supported between two or more bearings positioned at various locations along the shaft length. When such shafts as would be encountered in a turbocompressor are subject to high horsepower inputs and operate at rotational velocities on the order of 2000 r.p.m. and above, it is not uncommon to incur amplitudes of lateral vibration exceeding the usual tolerance of on the order of ±0.002 inches. Typically, the amplitudes of vibration at various axial shaft locations intermediate the bearings can be on the order of 0.01 inches and above. The eccentricity which results from those vibrations can produce various undesirable effects, not least of which is a rubbing contact between rotating elements on or near the shaft. An adverse effect on seals required for efficient operation of the machinery, including premature seal failure, is a typical consequence of such vibration.

For overcoming the adverse effects of vibration, various approaches have been undertaken including but not limited alone or in combination to increases in shaft diameter, material substitutions, mass reductions, use of special or increased number of bearings, special types and locations of oil seals where feasible, limiting operating speed of the equipment to exclude rotational velocities at which vibration tends to become severe, etc. Another approach frequently utilized almost as a last resort has been a limiting of shaft length requiring changes to the equipment that would otherwise be unnecessary. The latter frequently results in excessive manufacturing costs which either have to be absorbed or passed on to the customer.

While the mentioned approaches to the problem have amounted to an expedient, they have never been regarded as completely satisfactory. Yet despite recognition thereof a satisfactory solution has not heretofore been known.

SUMMARY OF THE INVENTION

This invention relates to shaft dampening apparatus and more specifically to apparatus effective for limiting amplitudes of lateral vibration of a rotating shaft to within tolerable limits. In accordance with the invention, dampening of a rotating shaft at selected locations along the shaft length intermediate the bearings is effected by utilizing an electrically conductive ring secured to the shaft for rotation therewith. The ring is electrically insulated from the shaft and is positioned at or near the location along the shaft length at which the maximum amplitude of lateral vibration is anticipated. A transverse magnetic field imposed contiguous to the ring periphery is provided by at least one pair of spaced magnets. Penetration of the magnetic field by the vibrating ring induces an electrical current in the ring causing energy dissipation that reduces the shaft amplitude. By effectively controlling the vibration amplitudes in that manner, the previous generally unsatisfactory approaches to the problem are overcome in a highly effective and economical manner.

It is therefore an object of the invention to provide novel apparatus for dampening amplitudes of lateral vibration of a rotating shaft.

It is a further object of the invention to effect the previous object in an economical and effective manner in overcoming the limitations imposed by previous approaches to the problem.

Figure 1:
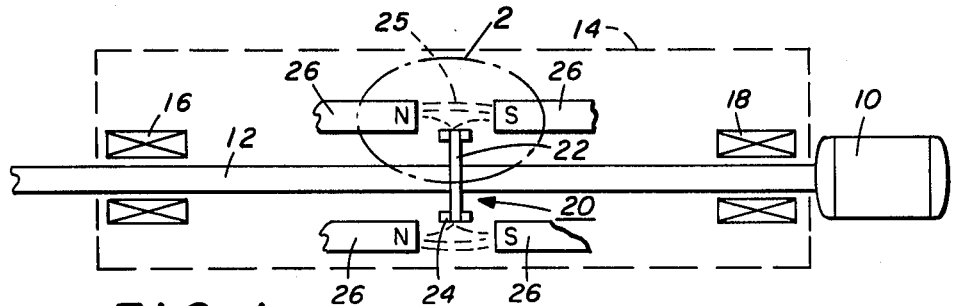
FIG. 1 is a diagrammatic illustration of rotating machinery employing the dampening apparatus of the invention.
Figure 2:
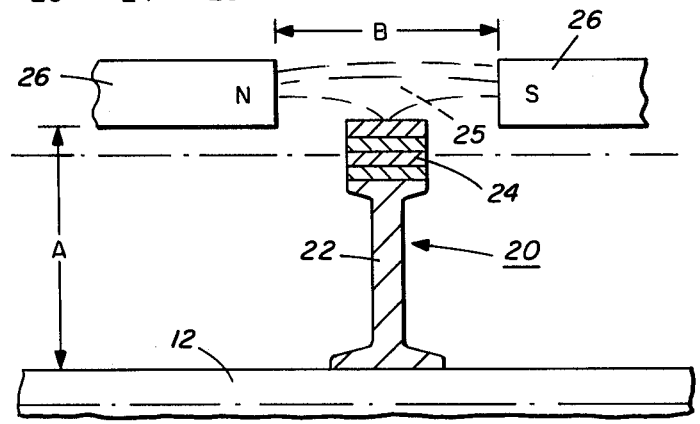
FIG. 2 is an enlarged fragmentary view of the encircled portion 2 of FIG. 1 for a non-vibratory condition of the rotating shaft.

Referring now to the drawings, there is illustrated in FIG. 1 a motor 10 driving a shaft 12 within machinery 14 shown in phantom and which typically could comprise a turbocompressor or the like. Supporting shaft 12 for rotation at opposite ends thereof are bearings 16 and 18. Intermediate the bearings the shaft, in the absence of the invention to be described, would be free to incur whatever offsets or the like that might be imposed by the forces being encountered.

In accordance with the invention a ring 20 is secured to shaft 12 for rotation therewith shown for purposes of illustration at an intermediate location approximately central between the bearings 16 and 18. Ring 20 includes a body 22 secured to the shaft as by keying, welding, etc. and at least centrally comprised of a composition having relatively high tensile strength and high electrical resistance. Typically suitable for that purpose would be K-monel age hardened. Banded about the annular periphery of body 22 are one or more layers 24 of an electrically conductive material such as gold, silver or copper.

Figure 3:
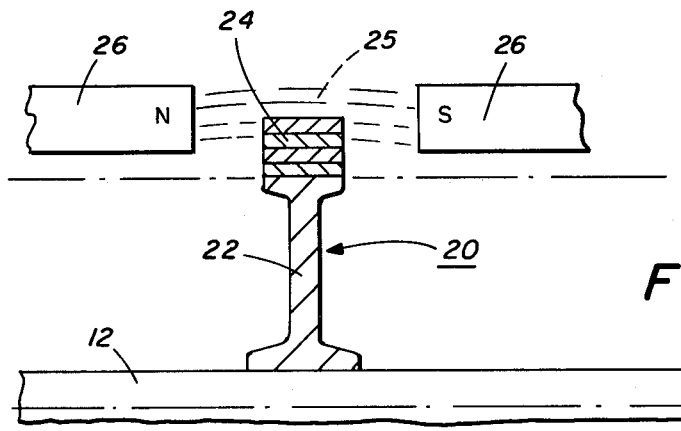
FIG. 3 is an enlarged fragmentary view similar to FIG. 2 for a vibratory condition of the rotating shaft.

Cooperating with ring 20 in order to effect operability is a transverse magnetic field 25 extending circumferentially about the ring periphery and provided by a plurality of elongated spaced apart permanent magnets 26. The magnets are arranged concentrically about shaft 12 a radial distance A at which the inward edge of field 25 generally coincides with the diameter of ring 20. The north and south poles of magnets 26 are symmetrically spaced apart with respect to ring 22 a distance B as will be explained. In that arrangement, vibration excursions of shaft 12 at the location of ring 20 will cause the conductive layers or bands 24 of ring 20 to penetrate magnetic field 25 in the manner illustrated in FIG. 3.

Radial ring penetration of magnetic field 25 induces a circumferential electrical current in ring bands 24 proportional to the radial velocity of shaft vibration and the change in magnetic field which the bands encounter. By virtue of bands 24 being a continuous circumferential conductor, the circumferential current generated thereby leads to energy dissipation from the bands as thermal energy to the pumped gas. Dissipation is in an amount generally proportional to the current squared times the electrical resistance of bands 24. Any force imposed radially on the shaft is opposed by the shaft inertia, shaft springiness and damping. Since heat dissipation from ring 20 is due to vibration of the ring in magnetic field 25, a damping force results from dissipation of the radial force times the vibration velocity.

Because of a tangential force component of field 25 encountered whenever bands 24 initially penetrate the magnetic field, the field is disposed at a distance A determined to be penetrated by outermost band 24 only when vibrational displacement of the shaft occurs thereat. In this manner excessive drag on shaft rotation that could result from such tangential force is avoided thereby enabling most of the field force to be effective for restoring shaft concentricity rather than imposing undesirable rotational drag.

At the same time, the radius of ring 20 and consequent drag should preferably be minimized since the force of resistance is directedly proportional to rotational velocity. Similarly, spacing B between opposed magnets 26 should be held to a minimum within practical limits in order to maintain the magnetic field gradient at the periphery of ring 20 to as great a value as possible. Moreover, magnetic field shaping as is known in the art can be used to enhance the dampening effect imposed by this arrangement.

In mathematical terms, a length of conductor l moving at a velocity v in a magnetic field at right angles to the field of strength B has induced in it a voltage E such that:

$$E = vBl$$

The force F encountered by the conductor is proportional to the induced current I:

$$F = IBl$$

The relation in a conductor that the current is equal to the voltage divided by the resistance $$I = E/R$$

$$F = IBl = (E/R)Bl = (v/R)B^2l^2$$

The energy dissipated W in a closed conductor is the product of the voltage and current $$W = EI = E^2/R = v^2B^2l^2/R$$

Assuming a ring 20 of 6 inches diameter, vibrating at 2000 cycles/min. with a cross sectional area of 1 square inch in a field of 1 weber/m$^2$ (10,000 gauss) with an amplitude of ±0.01 inches $F = 608.$ Newtons
$\phantom{F} = 137.$ pounds force and
$W = 20.5$ watts Assuming that the vibrating shaft 12 is 2 inches in diameter, 24 inches between bearings and of steel having a vibratory magnification factor of 100, the static deflection y under the dynamic force P would be $0.01''/100 = 1 \times 10^{-4}$ inches.

From the deflection formula for a round shaft supported on both ends with a center load $$y = (-1/48)(Pl^3/EI) \text{ where } I = \pi d^4/64$$

and $P = 7.91$ pounds at resonance.

The mechanical power of this vibration would be $$\pi Py/\text{cycle, or for 2000 cycles/min.} = 0.935 \text{ watts}$$

With a force P of 7.91 #'s, the magnification factor could be as low as 5.7 or the vibratory force could be about 17 times the force needed to cause the 0.01 inches deflection assumed at a dynamic magnification factor of 100. For the calculated example, radial vibration would be reduced from the assumed ±0.010 inches to about ±0.0012 inches.

Figure 4:
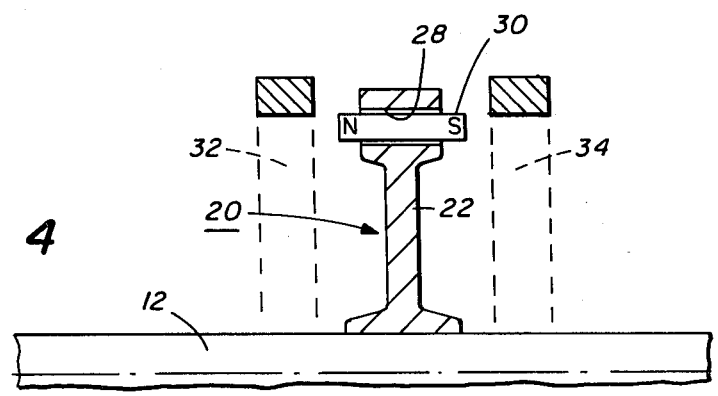
FIG. 4 is an enlarged fragmentary view similar to FIG. 2 for an alternative embodiment.

For the alternative embodiment of FIG. 4, ring 20 includes a plurality of uniformly spaced concentric apertures 28 near its periphery. Within each aperture is secured a permanent magnet 30 adapted to cooperate with stationary copper rings 32 and 34 encircling shaft 12. As in the previous embodiment, vibrational amplitude incurred by shaft 12 will cause an energy dissipating current to be generated for restoring concentricity.

In operation, any vibrational amplitude incurred by ring 20 in excess of the field will cause conductive bands 24 to penetrate into the magnetic field 25 of magnets 26. On bands 24 being immersed in the field, an energy dissipating current is instantly generated causing shaft concentricity to be immediately restored. Operation is simple and yet is highly efficient compared to previous approaches employed for that purpose. While for purposes of description only one ring 12 has been shown centrally located on shaft 12, a plurality of such rings could be employed at any additional locations thereon at which vibration excursion can be anticipated. Moreover, the arrangement of the conductive bands 24 and magnetic members could optionally be reversed in the manner of FIG. 4.

Since many changes could be made in the above construction and many apparently widely different embodiments of this invention could be made without departing from the scope thereof, it is intended that all matter contained in the drawings and specification shall be interpreted as illustrative and not in a limiting sense.

The embodiments of the invention in which an exclusive property or privilege is claimed are defined as follows:

1. In a mechanism having a shaft and spaced apart bearings supporting said shaft for rotation, shaft dampening apparatus for dampening lateral amplitudes of vibration incurred by said shaft in the course of rotation, said shaft dampening apparatus comprising in combination:
 (a) magnet means for producing a magnetic field axially extending concentrically about said shaft at an axial location thereabout between said bearings and generally coinciding with the location at which excessive lateral amplitude of vibration is anticipated to occur; and
 (b) annular member means having an electrically conductive band positioned axially displaced from said magnet means and radially adjacent the magnetic field produced by said magnet means;
 (c) one of said annular member means or said magnet means being rotationally secured to said shaft and the other of said annular member means of said magnet means being supported stationary radially outward of said one means whereby excessive vibrational amplitude incurred by said shaft in the course of shaft rotation causes said magnetic field to be penetrated by the electrically conductive band of said annular member means to induce an electrical current in said band effective to repel said vibrational amplitude.

2. In a mechanism according to claim 1 in which said magnet means is secured to said shaft for revolving therewith and said annular member means comprises at least a pair of stationary electrically conductive rings radially outward of said magnet means and spaced with one of said pair in a plane to each side of said magnet means.

3. In a mechanism according to claim 1 in which said annular member means comprises an annular member secured to said shaft electrically insulated therefrom and said magnet means is operative to form a magnetic field radially outward of the periphery of said annular member.

4. In a mechanism according to claim 3 in which said annular member is of a composition characterized by a relatively high tensile strength and a relatively high electrical resistance supporting an electrically conductive band about its circumference.

5. In a mechanism according to claim 4 in which said electrically conductive band is comprised of a plurality of superposed contiguous layers.

6. In a mechanism according to claim 1, 2 or 3 in which the penetration of said magnetic field by said electrically conductive band is effective to generate a thermal energy dissipation for repelling vibrational amplitudes of said shaft.

7. In a mechanism according to claim 6 in which the strength value of the formed magnetic field is correlated to generate a repelling energy dissipation force value at least equal to the anticipated dynamic force value of the shaft vibration thereat.

* * * * *